UNITED STATES PATENT OFFICE.

PAUL I. MURRILL, OF NEW YORK, N. Y., ASSIGNOR TO REVERE RUBBER COMPANY, A CORPORATION OF RHODE ISLAND.

PROCESS OF VULCANIZING RUBBER, RUBBER-LIKE, OR SIMILAR MATERIALS.

1,166,777. Specification of Letters Patent. Patented Jan. 4, 1916.

No Drawing. Application filed February 9, 1915. Serial No. 6,981.

*To all whom it may concern:*

Be it known that I, PAUL I. MURRILL, a citizen of the United States, residing at New York, county of New York, State of New York, have invented certain new and useful Improvements in Processes of Vulcanizing Rubber, Rubber-Like, or Similar Materials, of which the following is a full, clear, and exact description.

My invention relates to a new and useful process of vulcanizing rubber, rubber-like or similar materials, and pertains more particularly to that manner of vulcanizing known as cold curing, and has for an object the subjection of unvulcanized material to the action of a vulcanizing agent which is so treated that objectionable smelling, as well as deleterious compounds will be prevented from entering the rubber during vulcanization.

In vulcanizing by the cold cure process, sulfur monochlorid is generally used as the vulcanizing agent. The unvulcanized material is subjected to the action of this substance, vulcanization being accomplished by the fumes or by a spray or bath of the agent applied by a brush or otherwise. The affinity of this vulcanizing agent for the rubber is, however so great that an inert diluent as, for instance, carbon bisulfid or gasolene, is necessary. Commercial or crude gasolene has the objectionable properties of forming foul-smelling compounds with sulfur chlorid and these remain in the rubber after vulcanization. These compounds, furthermore, are known to be injurious to rubber products and materially shorten their life and usefulness. For these reasons gasolene is very little used as a diluent for sulfur chlorid by those skilled in the art. I have discovered that the formation of these compounds is due to the presence of olefins in the gasolene, and as far as I am aware, no attempts have hitherto been made to vulcanize with gasolene-diluted sulfur monochlorid characterized by the absence of olefins.

It is therefore the object of my invention to produce such a vulcanizing agent.

In one embodiment of the invention I add to the commercial gasolene enough sulfur monochlorid to combine with all the olefins of the gasolene and leave enough of the sulfur monochlorid over to give the desired concentration to the solution. The solution is then allowed to remain in this condition for a sufficient time to permit a part of the sulfur monochlorid to combine with all the olefins of the gasolene and is then distilled over at a temperature up to approximately 284° F. The resultant distillate is a solution of sulfur monochlorid in gasolene devoid of olefins, which when used as a vulcanizing agent, is inert so far as leaving any foul-smelling or deleterious compounds in the rubber is concerned.

However, the invention is not limited to the above described method of removing the olefins as any of the well known methods may be used, such as, for instance, (1) treating the gasolene with halogens such as bromin, chlorin, iodin, and the like, which form addition products with the olefins and render them less objectionable; (2) subjecting the gasolene to the action of fuming sulfuric acid. This dissolves out the olefins, but does not affect the saturated hydrocarbons. It is even possible that the olefins may be hydrogenated to effect their removal. In any event, it is merely essential to the practice of the invention that the gasolene be treated to remove the olefins therefrom so that the final gasolene sulfur monochlorid product will be characterized by the absence of the olefins.

What I claim is:

1. A vulcanizing agent consisting of sulfur monochlorid and gasolene characterized by the absence of olefins.

2. A vulcanizing agent consisting of sulfur monochlorid and a gasolene distillate of a solution of gasolene with suitable chemicals to remove the olefins.

3. The method of cold curing vulcanizable rubber, rubber-like or similar materials consisting of subjecting the same to the action of sulfur monochlorid and gasolene characterized by the absence of olefins.

Signed this 5th day of February, 1915.

PAUL I. MURRILL.

Witnesses:
SAMUEL C. YEATON,
FLORENCE MANUEL.